US010128969B2

(12) United States Patent
Yasuzaki

(10) Patent No.: US 10,128,969 B2
(45) Date of Patent: Nov. 13, 2018

(54) COMMUNICATION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Koji Yasuzaki, Tokorozawa-shi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/614,938

(22) Filed: Jun. 6, 2017

(65) Prior Publication Data
US 2018/0006746 A1 Jan. 4, 2018

(30) Foreign Application Priority Data

Jun. 30, 2016 (JP) .................. 2016-131032

(51) Int. Cl.
H04H 20/08 (2008.01)
H04N 1/00 (2006.01)
H04N 1/32 (2006.01)

(52) U.S. Cl.
CPC ........ *H04H 20/08* (2013.01); *H04N 1/00106* (2013.01); *H04N 1/32101* (2013.01); *H04N 2201/006* (2013.01)

(58) Field of Classification Search
CPC .............. H04H 20/08; H04N 1/32101; H04N 1/00106; H04N 1/00891; H04W 4/008; H04W 52/0245; H04W 52/0238; H04W 76/02
See application file for complete search history.

(56) References Cited

U.S. PATENT DOCUMENTS

2010/0093280 A1* 4/2010 Ahn ..................... H04W 52/242
455/41.2
2017/0013153 A1* 1/2017 Shin ................... H04N 1/00891

FOREIGN PATENT DOCUMENTS

JP H11-085416 A 3/1999

* cited by examiner

*Primary Examiner* — Leon-Viet Nguyen
(74) *Attorney, Agent, or Firm* — Fitzpatrick, Cella, Harper & Scinto

(57) ABSTRACT

A communication apparatus communicates with an information processing apparatus by a wireless communication method by broadcasting an advertising signal based on a Bluetooth Low Energy (BLE) standard. In a case where a first advertising signal which includes information indicating an apparatus state is broadcasted and of which a radio wave strength is set to a first radio wave strength and where a connection request is not received even after a predetermined time has elapsed since broadcasting the first advertising signal, the radio wave strength of the first advertising signal is changed to a second radio wave strength that is higher than the first radio wave strength. In a case where a second advertising signal which does not include the information indicating the apparatus state is broadcasted and of which the radio wave strength is set to the first radio wave strength and where the connection request is not received even after the predetermined time has elapsed since broadcasting the second advertising signal, the radio wave strength of the second advertising signal is not changed.

11 Claims, 9 Drawing Sheets

COMMUNICATION APPARATUS, CONTROL METHOD, AND NON-TRANSITORY COMPUTER-READABLE STORAGE MEDIUM

BACKGROUND OF THE INVENTION

Field of the Invention

The present invention relates to a transmission control technique of a predetermined signal.

Description of the Related Art

Among image processing apparatuses such as a printer, a multifunction peripheral, and the like, there is an image processing apparatus that can notify a client that is using the apparatus of an error state or a breakdown of the apparatus. In Japanese Patent Laid-Open No. 11-085416, there is disclosed a technique of performing change information notification by selecting, when a change such as an abnormality in an image processing apparatus (printer) has occurred, a change notification target in accordance with the state of the change.

In recent years, along with the development of wireless communication, it is expected that such a state change notification will be performed wirelessly. Various kinds of standards exist for wireless communication, and Bluetooth® Low Energy (BLE) is gaining attention as a wireless communication standard that enables low power communication. In BLE, an apparatus serving the role of a peripheral device performs advertising to allow a neighboring apparatus to discover itself, and an apparatus serving the role of a central device discovers the apparatus performing the advertising and connects to this apparatus.

For example, assume that a mobile terminal such as a smartphone is to operate as a central device and an image processing apparatus such as a printer is to be a peripheral device. In this case, the image processing apparatus broadcasts an advertising packet intermittently. The mobile terminal recognizes the presence of the image processing apparatus by capturing this advertising packet. When the advertising packet has been captured, the mobile terminal can establish a connection with the image processing apparatus which is the transmission source of the packet, perform a capability inquiry to the image processing apparatus, and execute a function of the image processing apparatus. For example, if the image processing apparatus has a print function and is in a state capable of executing a print job, the mobile terminal establishes a connection with the image processing apparatus, recognizes by an inquiry that the image processing apparatus can execute a print job, and issues a print job to the image processing apparatus.

In some cases, the mobile terminal cannot capture an advertising packet when the reception strength of the mobile terminal is insufficient for receiving the advertising packet transmitted from the image processing apparatus. In this case, even if the image processing apparatus transmits an advertising packet to inform the mobile terminal about the occurrence of the state change in itself such as an error, the advertising packet cannot be captured by the mobile terminal. As a result, the mobile terminal cannot grasp the error state of the image processing apparatus, and the error processing is delayed.

SUMMARY OF THE INVENTION

The present invention provides a technique for increasing, when a communication apparatus transmits a signal including specific information, the probability in which another apparatus can acquire the specific information.

According to one aspect of the present invention, there is provided a communication apparatus that can communicate with an information processing apparatus by a wireless communication method, comprising: a broadcasting unit configured to broadcast an advertising signal; and a determination unit configured to determine whether a connection request based on the advertising signal has been received from the information processing apparatus, wherein in a case where a state change of the communication apparatus has occurred, the broadcasting unit broadcasts an advertising signal which includes information indicating a change in an apparatus state, and in a case where reception of a connection request is not determined by the determination unit even after a predetermined time has elapsed since the broadcasting unit has broadcast the advertising signal which includes the information indicating the change in the apparatus state, a radio wave strength of the advertising signal is increased.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Configuration)

Figure 1:
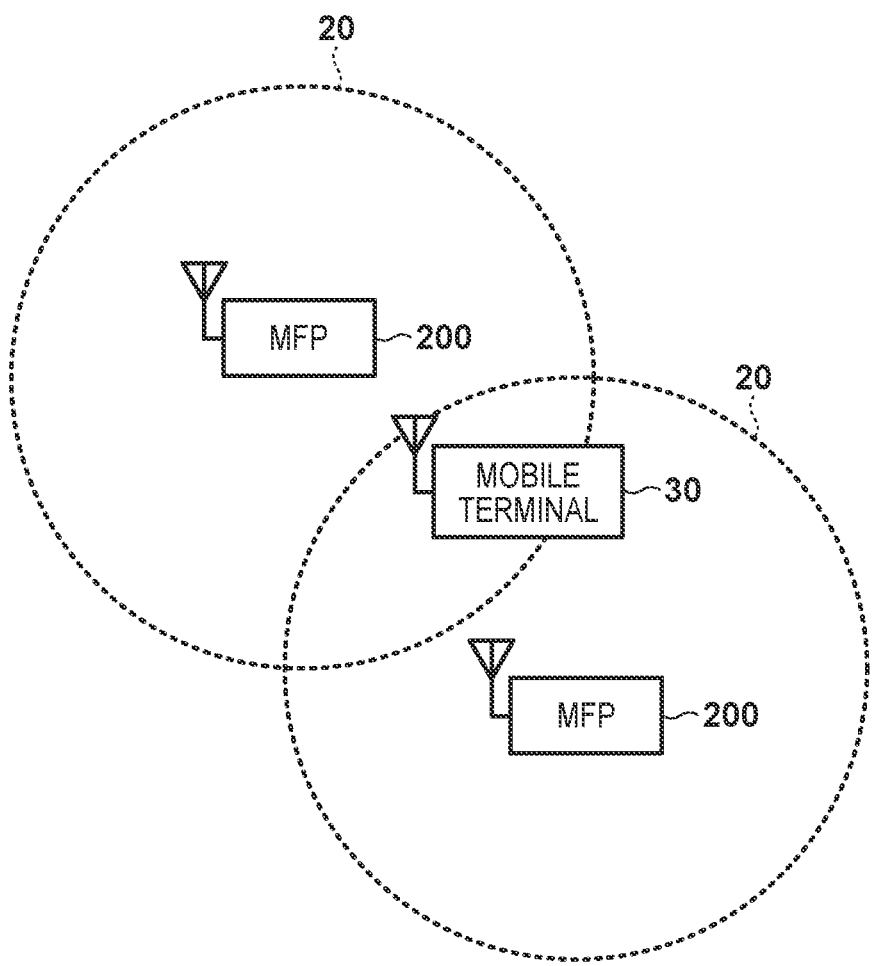
FIG. 1 is a view showing an example of a system configuration.

FIG. 1 shows an example of the configuration of a system according to this embodiment. The system is a wireless communication system that includes image processing apparatuses and a mobile terminal. In FIG. 1, each image processing apparatus is indicated as an inkjet method multifunction printer/multifunction peripheral (MFP) 200 which has functions such as print, scan, copy, fax, and the like. Each MFP 200 can operate as a BLE peripheral device that transmits an advertising signal (advertising packet) without network connection with a specific terminal. A mobile terminal is indicated as a mobile terminal 30 in FIG. 1. The mobile terminal 30 is a central node of BLE and operates as a central device capable of detecting an advertising signal and connecting with an apparatus operating as the transmission source peripheral device of the advertising signal.

The mobile terminal 30 is, for example, a wireless communication terminal which is portable and is capable of transmitting a print job to each MFP 200. The mobile terminal 30 can also instruct image processing such as a print start operation or the like to each MFP 200. The mobile terminal 30 can be, for example, an arbitrary type of an information processing apparatus that can handle a print target file of a mobile phone, a digital camera, a smartphone, or the like and has a communication function. The mobile terminal 30 can receive a signal having signal strength of a predetermined value or more. Hence, if the mobile terminal 30 is present in a range of each area 20 where the attenuation amount of a radio wave emitted from a corresponding MFP 200 is a predetermined level or less, the mobile terminal 30 can receive the advertising signal from this MFP 200. In addition, since an advertising signal of BLE includes information related to the transmission power of the signal, the central device can specify the attenuation amount of the radio wave level from the reception power and the information at the time of the reception of the advertising signal and specify the rough distance to the peripheral device.

(Apparatus Arrangement)

Figure 2A:
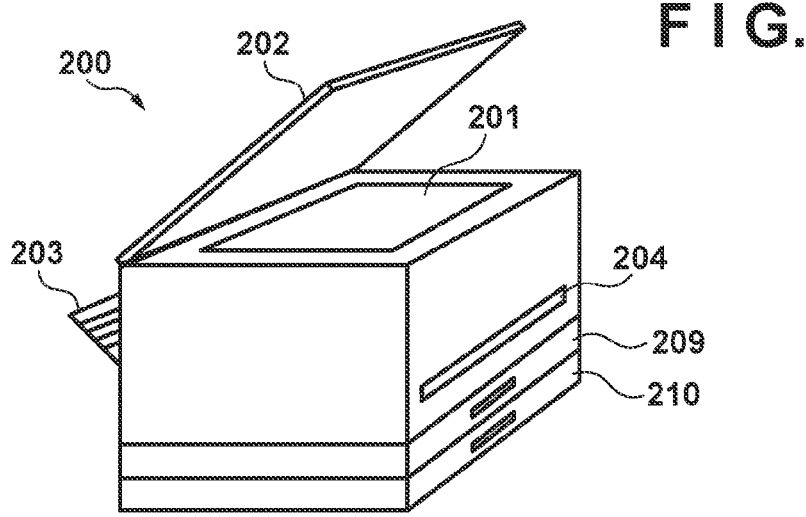
FIGS. 2A and 2B are views each showing an example of the outer appearance of an MFP.
Figure 2B:
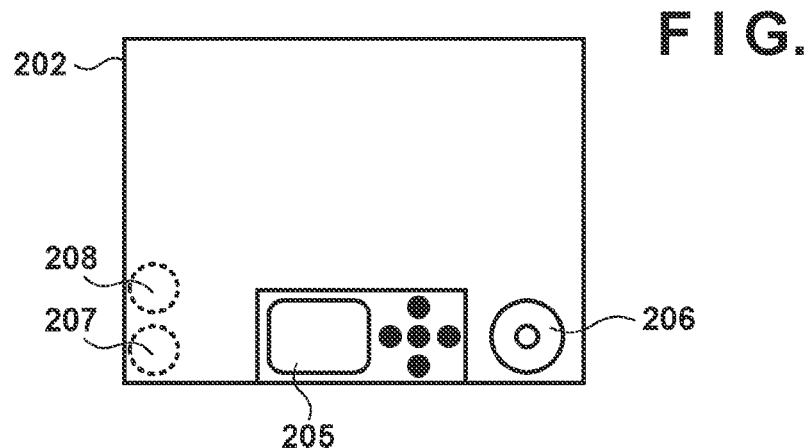

The apparatus arrangement of the MFP 200 will be described next. FIGS. 2A and 2B each show an example of the outer appearance of the MFP 200. FIG. 2A is a schematic view of the MFP 200. An original table 201 is a transparent glass table and is used when an original placed on the table is read by a scanner. An original cover 202 is a cover used to prevent the reading light from leaking outside when reading is performed by the scanner. A printing paper insertion port 203 is an insertion port used for setting sheets of various sizes. Sheets set on the printing paper insertion port 203 are conveyed, one by one, to the printing unit and are discharged from a printing paper discharge port 204 after undergoing a desired printing operation. Additionally, a first cassette 209 and a second cassette 210 can be used as other printing paper supplying units. For example, A3 sheets and A4 sheets can be set in the first cassette 209 and the second cassette 210, respectively, so that jobs for A3 sheets and A4 sheets can be executed without the user having to change the sheets manually. FIG. 2B is a top view of the MFP 200. An operation display unit 205 and an NFC (Near Field Communication) unit 206 are arranged on the upper portion of the original cover 202. The operation display unit 205 includes a display screen to display an image, an operation menu, and the like, a four-way selector used to move a cursor on the display unit, and keys for executing other various kinds of functions as needed. The NFC unit 206 is a unit for performing short-range wireless communication and can perform communication with another apparatus (mobile terminal) having a similar NFC communication function when such a mobile terminal is brought close to the unit. The NFC unit 206 can be arranged so that NFC communication is performed between the mobile terminal having an NFC communication capability and the MFP 200 when the mobile terminal is brought within about 10 cm of the unit. Note that the NFC unit 206 can be set so that the position where an NFC antenna is to be provided on the MFP 200 can always be visually checked by a user. This allows the user to know which position of the MFP 200 is the position where the mobile terminal is to be brought close to when he/she wants to cause his/her mobile terminal and the MFP 200 to communicate. Note that the NFC unit 206 can allow the user to visually check the position by, for example, causing the antenna position to light up when an opportunity to perform NFC communication is provided by an application or the like. A WLAN antenna 207 is an antenna for performing wireless LAN communication, and a BT antenna 208 is for communication by Bluetooth® or BLE. Note that the communication apparatuses can be more apart from each other in communication by wireless LAN and Bluetooth® than that in communication by NFC. Hence, the WLAN antenna 207 and the BT antenna 208 can be, for example, arranged by being embedded in the housing of the MFP 200 so as not to be visually checked from the outer appearance or may be arranged so that they may be visually checked from the outer appearance.

Figure 3:
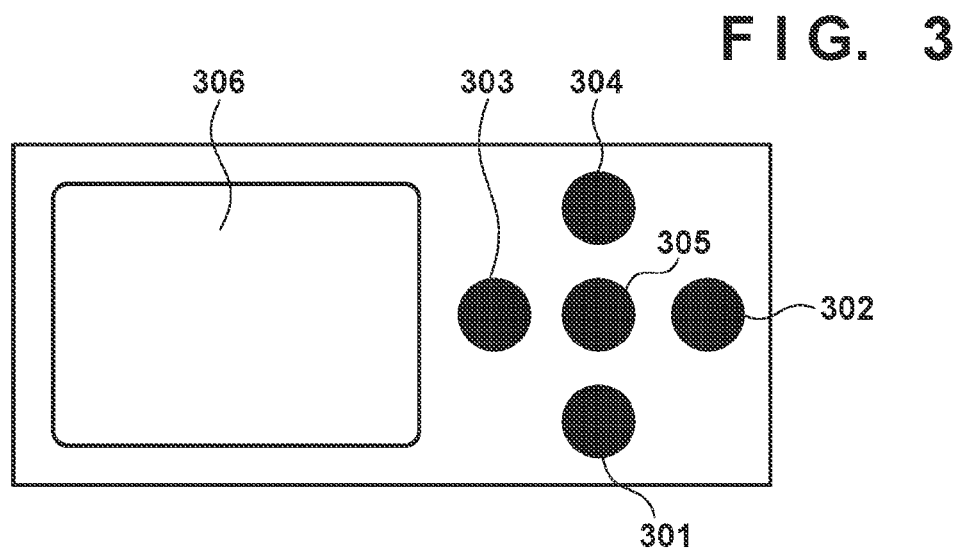
FIG. 3 is a view showing an example of an operation display unit of the MFP.

FIG. 3 is a plan view of the operation display unit 205. A display unit 306 is a display screen that displays images, an operation menu, and the like and is formed by, for example, a dot matrix LCD. Keys 301 to 304 are used for moving a cursor displayed on the display unit 306, inputting numbers, and the like. A set key 305 is a key used for setting input. The set key 305 can be used for setting a function or executing a function such as start of printing.

Figure 4A:
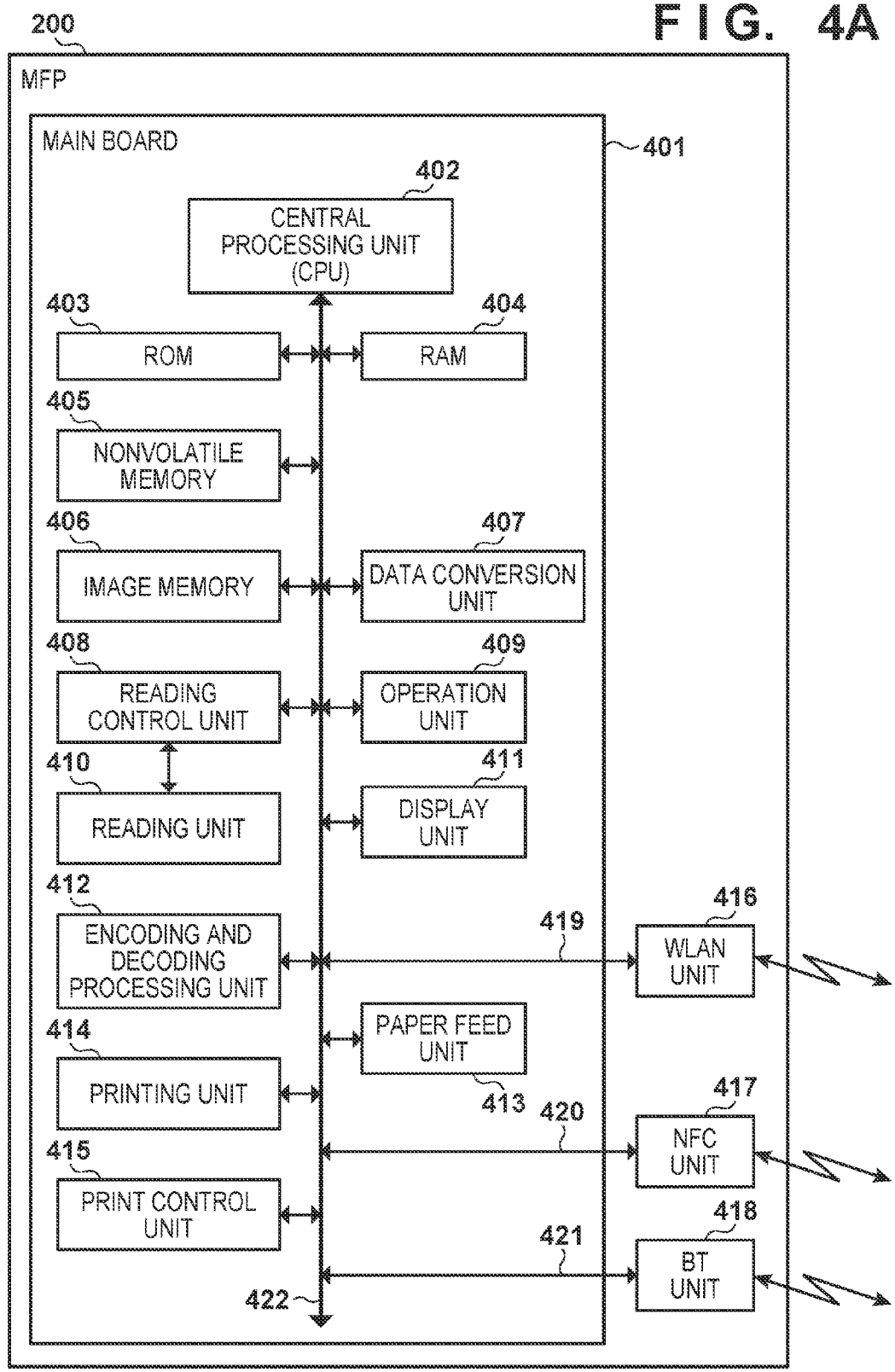
FIG. 4A is a block diagram showing an example of the arrangement of the MFP.

The internal (hardware and functions) arrangement of the MFP 200 will be described next with reference to FIG. 4A. The MFP 200 is formed to include a main board 401 that performs the main control of the apparatus and function units for communication. The function units for communication include, for example, a WLAN unit 416 which is used for wireless LAN communication, an NFC unit 417 which is used for NFC communication, and a BT unit 418 which is used for Bluetooth® communication. In the main board 401, a CPU (Central Processing Unit) 402 is a central control unit and controls the overall operation of the MFP 200. Note that the MFP 200 can use an application specific integrated circuit (ASIC), a field programmable gate array (FPGA), or the like to implement at least some of the functions.

A ROM 403 stores control programs to be executed by the CPU 402, an embedded operating system (OS) program, and the like. In this embodiment, the respective control programs stored in the ROM 403 execute software control such as scheduling and task switching under the management of the embedded OS stored in the ROM 403. A RAM 404 is implemented by an SRAM (Static RAM) or the like, stores data such as program control variables and the like, and stores data such as settings registered by the user and management data of the MFP 200. Various kinds of work buffer areas are provided in the RAM 404. A nonvolatile memory 405 is formed by a memory such as a flash memory or the like and continues to store data even when the power supply of the MFP 200 is turned off. For example, the nonvolatile memory 405 stores user data such as FAX telephone numbers, communication history, network information, and the like, a list of previously connected apparatuses, and setting information of the MFP 200 such as menu items for a printing mode or the like, correction information of an inkjet printhead, and the like. An image memory 406 is formed by a memory such as a DRAM (Dynamic RAM) and stores image data received via one of the aforementioned communication functions, image data processed by an encoding and decoding processing unit 412, and the like.

Note that the memory configuration is not limited to the aforementioned configuration. A memory of a type other than those of the aforementioned memories can be used, and memories described above as formed by two or more memories can be formed as one memory.

A data conversion unit 407 performs analysis of various formats of data such as page descriptive language (PDL) and data conversion from image data to print data. A reading control unit 408 controls a reading unit 410 (for example, a CIS (contact-type image sensor)) to optically read an original placed on the original table 201 of FIG. 2A. Then, the reading control unit 408 executes, via an image processing control unit (not shown), various kinds of image processing such as binarization processing and halftone processing, thereby generating and outputting high-resolution image data. An operation unit 409 and a display unit 411 correspond to the operation display unit 205 described in FIG. 3. That is, the operation display unit 205 is formed by integrating at least some parts of the operation unit 409 and the display unit 411. The encoding and decoding processing unit 412 performs encoding/decoding processing and enlargement/reduction processing for image data (JPEG, PNG, or the like) handled by the MFP 200.

A paper feed unit 413 holds sheets and supplies sheets for printing under the control of a print control unit 415. The paper feed unit 413 has a plurality of paper feed units and can hold a plurality of types of sheets in one apparatus. In this case, the print control unit 415 can perform control to select a paper feed unit to be used to supply paper sheets. The print control unit 415 performs, via the image processing control unit (not shown), various kinds of image processing such as smoothing processing, print density correction processing, and color correction to the print target image data and outputs the processed high-resolution image data to a printing unit 414. The printing unit 414 can be a circuit and a mechanism functioning as an inkjet printer which prints an image by discharging, from a printhead, ink supplied from an ink tank. The print control unit 415 can also periodically read out the information of the printing unit 414 and perform control to update the information stored in the RAM 404. For example, the print control unit 415 can update the status information, such as the remaining amount in an ink tank and the state of the printhead, which are stored in the RAM 404.

The MFP 200 includes, as described above, the WLAN unit 416, the NFC unit 417, and the BT unit 418 for performing wireless communications by the wireless LAN, NFC, and Bluetooth, respectively, and can perform data communication with another device such as a mobile terminal. Note that the WLAN unit 416 can be implemented by a circuit and a control program that implement a function for executing communication by, for example, a wireless LAN complying with the IEEE802.11 standard series or a wireless LAN complying with another standard. The NFC unit 417 and the BT unit 418 also can be implemented by circuits and control programs that implement functions for executing communications complying with NFC and Bluetooth standards, respectively. Note that the BT unit 418 has, for example, a communication function complying with the Bluetooth4.0 standard and can support communication by at least Bluetooth Low Energy (BLE). Each of the WLAN unit 416, the NFC unit 417, and the BT unit 418 converts data into a packet and transmits the packet to another apparatus via a corresponding antenna. Also, each of the WLAN unit 416, the NFC unit 417, and the BT unit 418 receives a packet transmitted as a wireless signal from another external apparatus, converts the packet into data, and outputs the converted data to the CPU 402. The WLAN unit 416, the NFC unit 417, and the BT unit 418 are connected to a system bus 422 of the main board 401 by bus cables 419, 420, and 421, respectively. Note that the MFP 200 can have a communication function other than these communication functions. In addition, each of the aforementioned communication functions can be detachable, and the MFP 200 can include an interface (for example, a USB (Universal Serial Bus) interface) for connecting with a communication function device. Note that the respective components in the main board 401 are connected to each other via the system bus 422 under the management of the CPU 402.

Figure 4B:
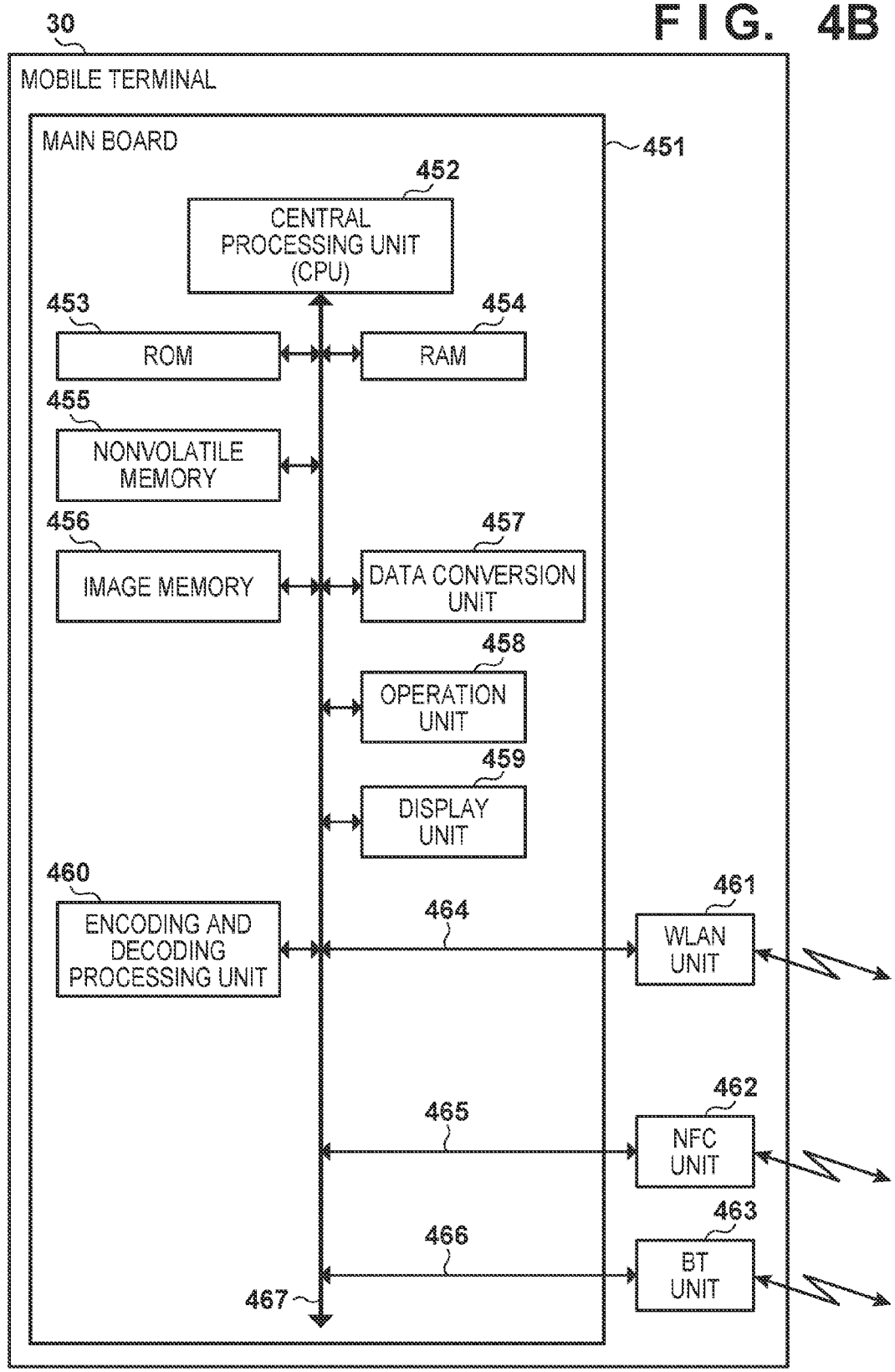
FIG. 4B is a block diagram showing an example of the arrangement of a terminal apparatus.

FIG. 4B is a block diagram showing the control arrangement of the mobile terminal 30.

The mobile terminal 30 includes a main board 451 that performs the main control of the apparatus, a WLAN unit 461 that performs WLAN communication, an NFC unit 462 that performs NFC communication, and a BT unit 463 that performs classic Bluetooth communication and BLE communication.

In the main board 451, a CPU 452 is a system control unit and controls the overall mobile terminal 30. A ROM 453 stores various kinds of programs such as control programs to be executed by the CPU 452, an embedded operating system (OS) program, and the like. In this embodiment, the control programs stored in the ROM 453 execute software control such as scheduling and task switching under the management of the embedded OS stored in the ROM 453. A RAM 454 is formed by a memory such as an SRAM (Static RAM) or the like, stores various kinds of data such as program control variables, settings registered by the user, and management data of the mobile terminal 30, and is provided with various kinds of work buffer areas.

A nonvolatile memory 455 is formed from a memory such as a flash memory and holds stored data also when the power supply is turned off. More specifically, the data includes a communication history, user data such as network information, a list of previously connected MFPs, and setting information of the mobile terminal 30 such as menu items of a communication mode and the like. An image memory 456 is formed from a memory such as a DRAM (Dynamic RAM) and stores various kinds of data such as image data received via the respective communication units, image data processed by an encoding and decoding processing unit 460, and the like.

Note that the memory configuration formed from the aforementioned various kinds of memories is not limited to this and its numbers, characteristics, storage capacity and the like can be formed as needed in accordance with the use and the purpose.

A data conversion unit 457 performs processing such as data analysis, conversion from image data to job data, and the like.

An operation unit 458 is formed by a touch panel, keys, and buttons for performing an operation to the mobile terminal 30. A display unit 459 is formed by, for example, an LCD. The encoding and decoding processing unit 460 performs various kinds of processing such as encoding processing, decoding processing, and enlargement/reduction processing to image data (JPEG, PNG, or the like) processed by the mobile terminal 30.

The mobile terminal 30 includes, as communication units for wireless communication, the WLAN unit 461, the NFC unit 462, and the BT unit 463 and can perform wireless communication by respective wireless communication methods complying with three types of communication standards, WLAN, NFC, and BLE. That is, each of the WLAN unit 461, the NFC unit 462, and the BT unit 463 is a unit for implementing communication complying with the corresponding one of the WLAN, NFC, and BLE standards. The BT unit 463 is a unit used for both classic Bluetooth and BLE communication. The WLAN unit 461, the NFC unit 462, and the BT unit 463 are communication units to perform data communication with another device such as an MFP. Each of these communication units converts data into a packet and transmits the packet to another device. On the other hand, each of these communication units converts a packet from another external device into data and transmits the converted data to the CPU 452.

The WLAN unit 461, the NFC unit 462, and the BT unit 463 are connected to a system bus 467 via corresponding bus cables 464, 465, and 466, respectively.

Note that the above-described components 453 to 463 are connected to each other via the system bus 467 under the management of the CPU 452.

Figure 5:
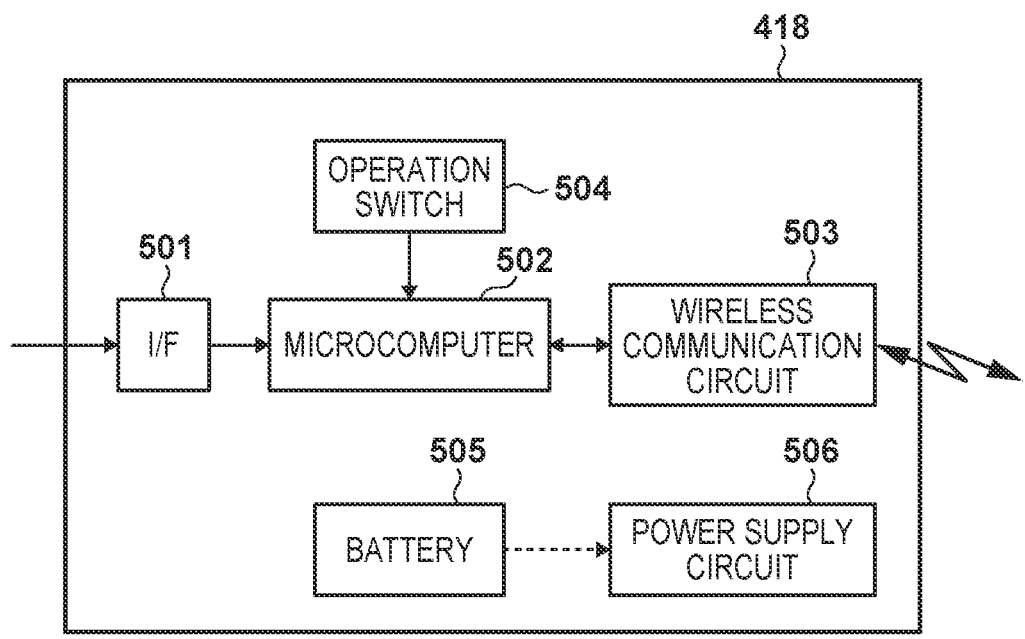
FIG. 5 is a block diagram showing an example of the arrangement of a BT unit.

FIG. 5 is a block diagram showing the schematic arrangement of the BT unit 418/BT unit 463. A description using the BT unit 418 as an example will be given hereinafter. The arrangement of FIG. 5 can be implemented, for example, by a dedicated circuit and program for Bluetooth® communication. An interface (I/F 501) is an interface for connecting to the system bus 422 of the MFP 200. The I/F 501 can acquire, for example, information stored in the RAM 404. In this embodiment, information related to the state of a communication apparatus is acquired from the main board 401 via the I/F 501. A microcomputer 502 is a microprocessor that performs data sampling and wireless communication processing. This microcomputer is equipped with a RAM and a flash memory. A wireless communication circuit 503 is formed by a wireless communication chip, a quartz oscillator, an inductance, a capacitor, and the like and performs reception and transmission of wireless signals. An operation switch 504 is a switch to turn on or off the power in a standby state. A battery 505 can be a primary battery or a secondary battery. A power supply circuit 506 is a circuit that performs voltage adjustment to supply power from the battery 505 more efficiently.

Here, the microcomputer 502 can, for example, determine whether to include apparatus state information in the advertising signal, in a manner described below, in accordance with the information of the state of the MFP 200 acquired via the I/F 501 and transmit the advertising signal via the wireless communication circuit 503. The microcomputer 502 can also monitor whether a connection request signal has been received via the wireless communication circuit 503 and control the wireless communication circuit 503 to perform connection processing. Furthermore, the microcomputer 502 can, for example, determine whether the advertising signal has been received by a nearby terminal in accordance with whether the connection request signal has been received and control the transmission power of the advertising signal transmitted from the wireless communication circuit 503 in accordance with the determination result. In this manner, the internal processing of the BT unit 418 can be performed comprehensively by the microcomputer 502, and the BT unit 418 can perform communication uniquely even if the power supply of the apparatus of the MFP 200 is turned off. Note that the BT unit 418 may transmit, via the I/F 501, a command to the MFP 200 to turn on the power supply in accordance with the reception of a connection request from a nearby terminal. This allows the MFP 200 to perform control so that its power supply will be OFF normally and be turned on when the presence of a terminal wanting to perform printing or the like is detected nearby by BLE.

The BT unit 418 notifies other apparatuses in the neighborhood of its presence by transmitting an advertising signal at a settable predetermined time interval in the manner to be described below. Then, the BT unit 418 can perform communication with another apparatus (for example, a mobile terminal) that has detected the advertising signal by receiving a connection request from this apparatus. Note that although the communication rate is low in compliance with the BLE standard, the BT unit 418 can perform low power communication. Hence, communication can be performed over a long period of time even if the battery 505 is, for example, a battery having a comparatively small capacity such as a button battery. Note that the user can turn off the communication function of the BT unit 418 by the operation switch 504, and the BT unit 418 can be set so as to perform communication only when the communication function is turned on by the user.

Figure 6:
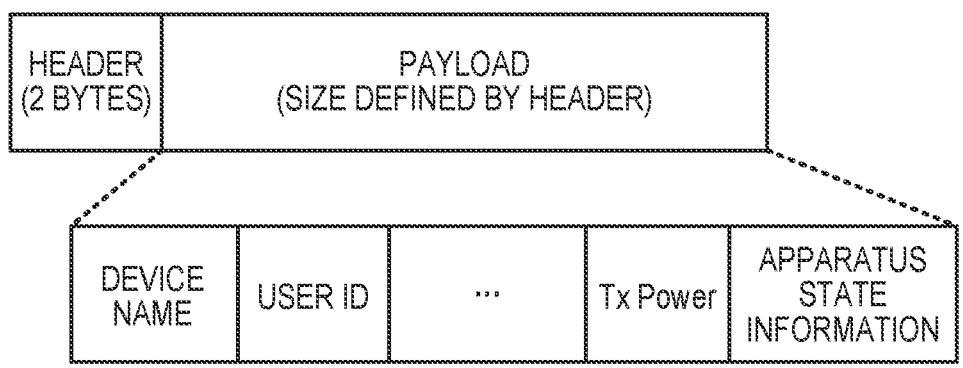
FIG. 6 is a view showing an example of the configuration of an advertising signal.

When the BT unit 418 is set in a power-on state, it performs initialization processing and is set in an advertising state. When the BT unit 418 is set in the advertising state, it periodically transmits an advertising signal at a settable predetermined time interval and notifies other apparatuses in the neighborhood of its presence. FIG. 6 is a view showing an example of the configuration of an advertising signal (advertising packet) broadcast by the BT unit 418 to its neighborhood. An advertising signal is formed by a 2-byte header and a payload, as shown in FIG. 6. A header area is an area for storing the type of the packet, the size information of the payload, and the like, and a payload area is an area that can store the transmission power (Tx Power) of the packet and the information ("apparatus state information" in FIG. 6) related to the apparatus state in addition to the device name and the mounted profile information. A bit is assigned for each state type as the information related to the apparatus state, and each assigned bit is set to be either 0 or 1 to indicate the apparatus state. The details of the apparatus state will be described later. As pieces of information related to the apparatus state, there are information indicating the occurrence of a change in the apparatus state (information indicating an apparatus state change) and information indicating a normal state. Note that the information related to the apparatus state may be included in the advertising packet only in a state other than the normal state, that is, when there is a change in the apparatus state. In other words, when the apparatus state is set to "normal", the information related to the apparatus need not be included in the advertising packet. A BLE communication apparatus which receives the advertising packet can specify a propagation loss from the reception signal strength of the received packet and the Tx Power value stored in the packet. The communication apparatus can estimate (based on, for example, a propagation model corresponding to the environment obtained by attenuation in proportion to the square or 3.5 power of the distance) the rough distance based between the self-apparatus and the apparatus that transmitted the advertising packet from the specified propagation loss value.

Figure 9:
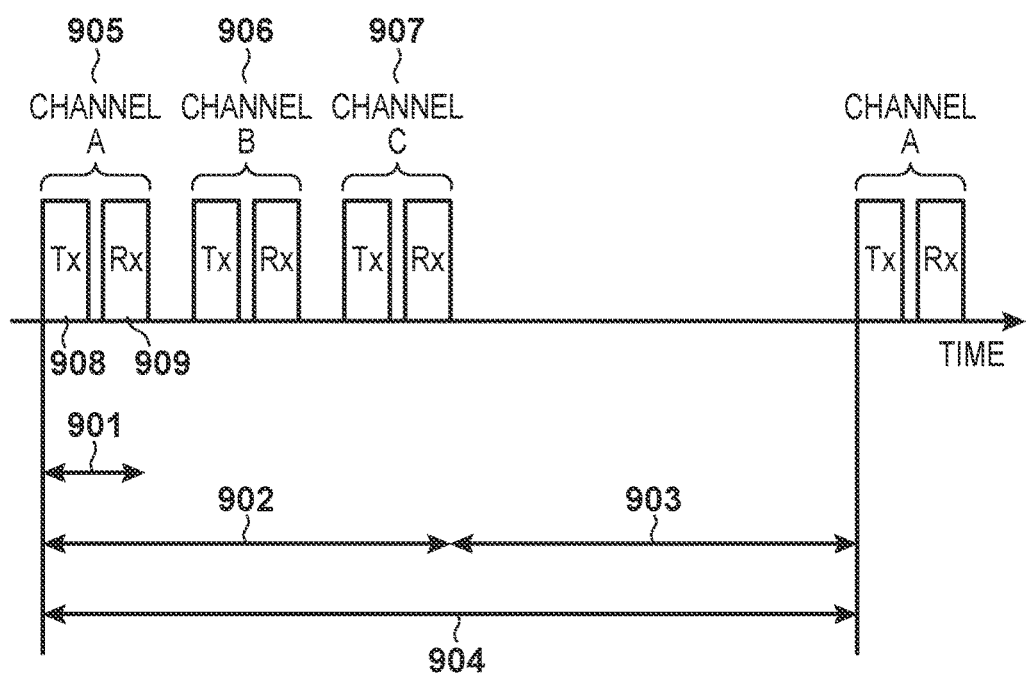
FIG. 9 is a view showing broadcast timings of an advertising packet.

FIG. 9 is a view showing the advertising signal which is broadcast by the BT unit 418 to its neighborhood.

In FIG. 9, the MFP 200 shows a normal advertising signal. Reference symbol Tx908 represents an advertising signal transmission interval, and the MFP 200 transmits a predetermined packet (advertising packet) by causing a transmission circuit to operate. Reference symbol Rx909 represents a standby interval in which the MFP stands by for a response from a communication partner (for example, the mobile terminal 30). More specifically, in the standby interval Rx909, the MFP 200 switches to a state in which a response from the communication partner can be accepted by turning on the power supply of a reception circuit. Then, after a predetermined time has elapsed, that is, in an interval other than the standby interval Rx909, the MFP 200 turns off the power supply of the reception circuit to switch to a state in which a response cannot be accepted. The intervals Tx908 and Rx909 are performed in one channel A 905, and an advertising time 901 is defined by the intervals Tx908 and Rx909 of the channel A 905. In the same manner as the channel A 905, other channels such as a channel B 906 and a channel C 907 are also present, and the MFP 200 repeats the intervals Tx and Rx in the determined number of channels. For example, in the BLE standard, 37, 38, and 39 channels are assigned as advertising packet channels, and the channel A 905, the channel B 906, and the channel C 907 correspond to these channels in this embodiment.

An active interval 902 is an interval in which the MFP 200 performs transmission/reception by the intervals Tx and Rx. A power saving interval 903 is an interval in which transmission/reception by the intervals Tx and Rx is not performed. The longer the power saving interval 903, the more the power consumption of the BT unit 418 is suppressed. In this manner, a predetermined time interval from the broadcasting of the advertising signal and after standing by for a response to the broadcast advertising signal for a predetermined time (active interval 902) until the next advertising signal is broadcast is called an advertising interval 904.

(Processing Sequence)

Figure 7:
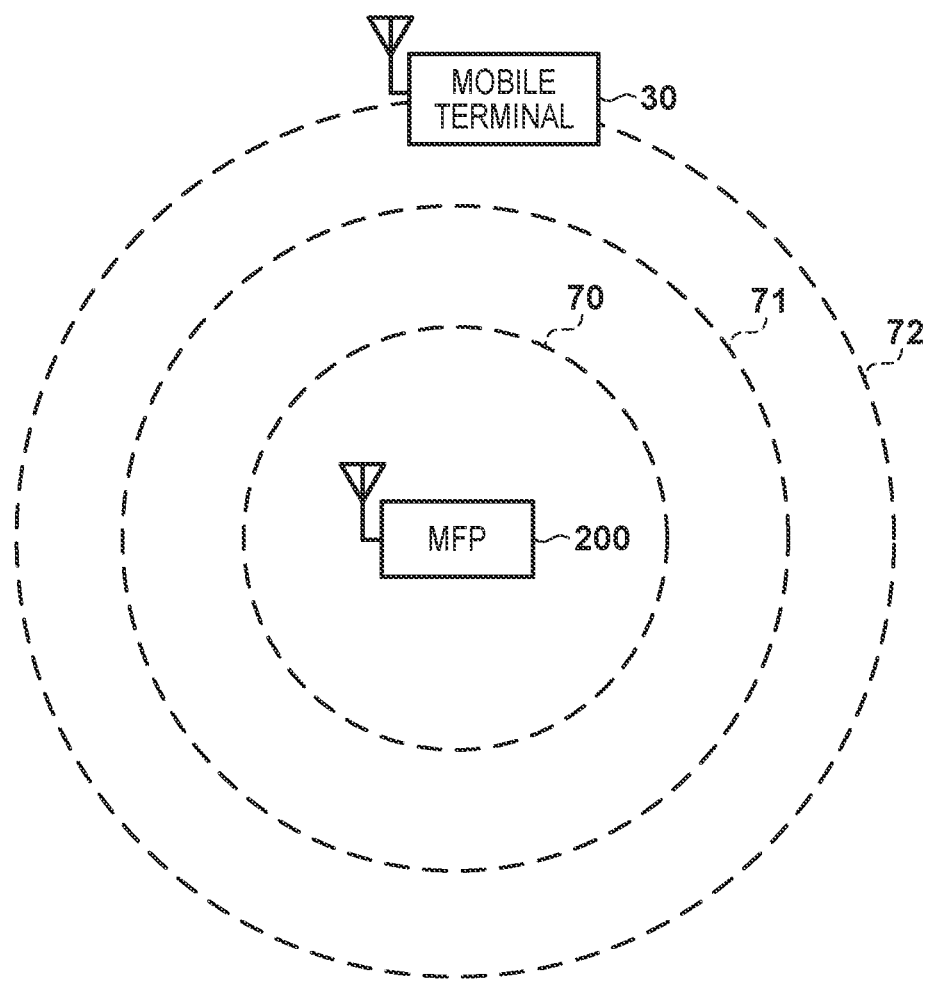
FIG. 7 is a view showing an example of the range in which a broadcast advertising signal can be received.

FIG. 7 is a view showing an area where another apparatus such as a mobile terminal or the like can accept an advertising packet broadcast from the MFP 200. Note that FIG. 7 shows a case in which the MFP 200 has transmitted an advertising packet using three stages of transmission power. A region 70 is a region in which the other apparatus can receive an advertising packet when the MFP 200 has broadcast the packet using the first transmission power which is the lowest power of the three stages. Here, a packet receivable region indicates a region in which the other apparatus can receive the advertising packet using a reception power of an amount that allows information to be extracted without an error. In other words, the region 70 is a region in which the advertising packet can be definitely transmitted to a communication partner when the MFP 200 broadcasts the advertising packet using the first transmission power. Note that in an actual radio wave propagation environment, due to the presence/absence of a shielding object or a reflected wave, the packet receivable region is not a perfect circle like the region 70 in most cases. However, for the sake of descriptive convenience, a perfect circle is used to represent a packet receivable region in FIG. 7. In addition, the range in which a signal transmitted using the same amount of power can be delivered changes depending on the type of the BT unit 418 equipped in the MFP 200.

If the mobile terminal 30 is not present in the range of the region 70 while the MFP 200 is transmitting the advertising packet by the first transmission power, the mobile terminal 30 cannot acquire information such as the device information and the state information from the advertising packet. Hence, in order to transmit the information to the mobile terminal 30, the MFP 200 expands the range in which the radio wave is delivered to a region 71 and subsequently to a region 72 by increasing the radio wave strength to the second transmission power which is the second highest power of the three stages and to the highest third transmission power sequentially. In this embodiment, for example, if a change (such as an error) occurs in the state of the MFP 200 when information which needs to be delivered to the mobile terminal 30 has been generated, transmission output control is performed so that the advertising packet is delivered to the mobile terminal 30 as much as possible. Note that the smaller the transmittable region, the lower the power (transmission power) necessary for transmitting the advertising packet. On the other hand, if the MFP 200 has no information which needs to be delivered particularly and is transmitting an advertising packet to notify other apparatuses in the neighborhood of its presence, the MFP continues to transmit an advertising packet using the lowest first transmission power without increasing the transmission power of the signal. As a result, it is possible to decrease the power necessary for communication while increasing the probability that the information which needs to be notified to the mobile terminal 30 is delivered to the mobile terminal. A transmittable region is for example, within a radius of 5 m for the region 70, within a radius of 25 m for the region 71, and within a radius of 50 m for the region 72. In this manner, the radio wave transmission output (radio wave strength) is switched in this embodiment. More specifically, if the MFP receives no response such as a connection request from another apparatus in a predetermined time, the radio wave transmission output is increased.

Note that in this embodiment, although the radio wave strength can be switched in three stages, the arrangement is not limited to this. For example, the radio wave strength may be changeable in five stages. In such a case, the range in which the radio wave can be delivered can be formed to have five stages of regions.

Figure 8:
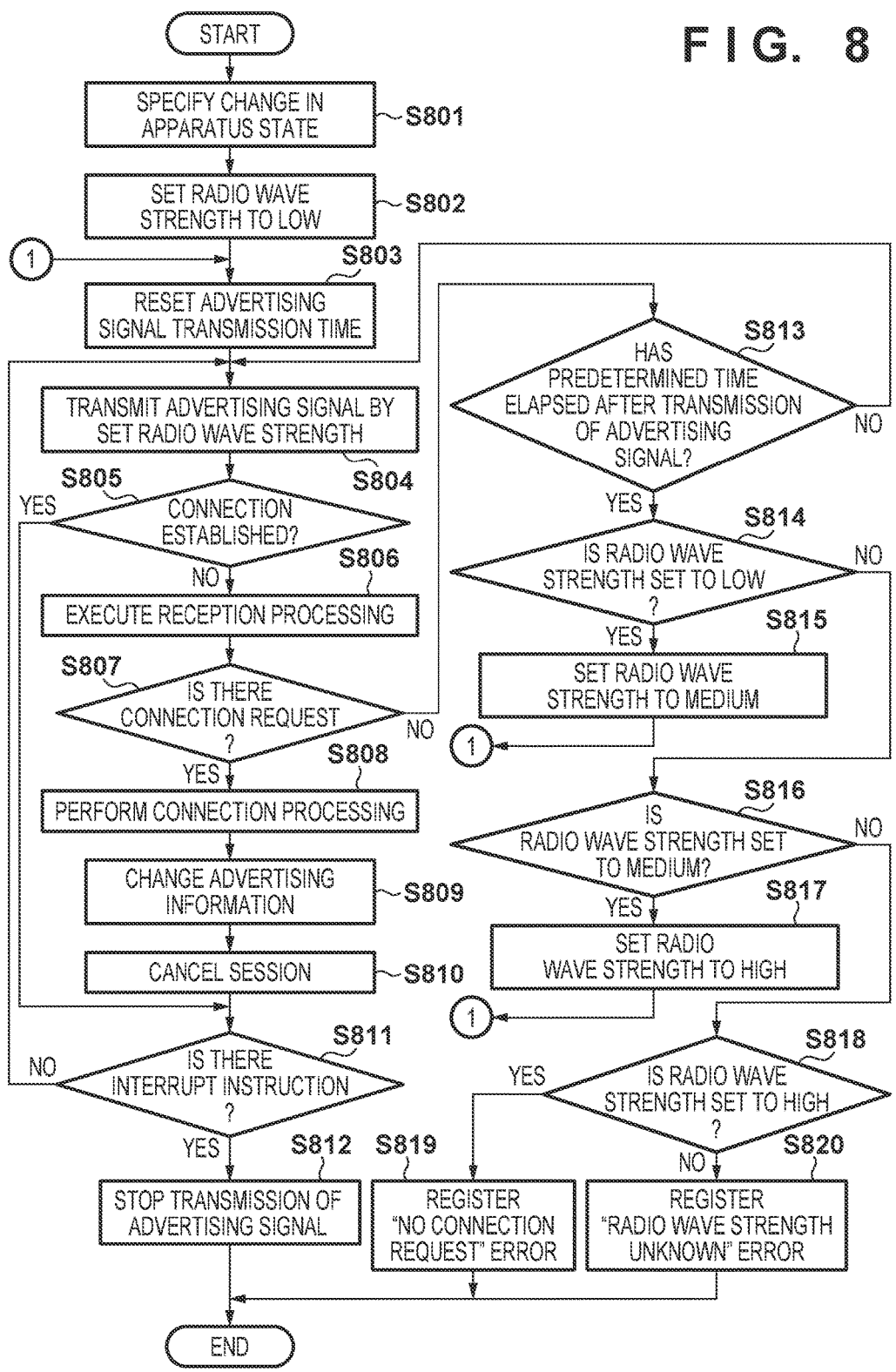
FIG. 8 is a flowchart showing a sequence of processing executed by the MFP.

Details of the aforementioned processing will be described next with reference to FIG. 8. FIG. 8 is a flowchart showing an example of the procedure of processing executed by (the BT unit 418 of) the MFP 200. The processing of FIG. 8 can be implemented by the microcomputer 502, for example, executing a program stored in a RAM or the like which has been provided in the microcomputer 502.

Here, the MFP 200 continues to transmit the advertising signal for notifying other apparatuses in the neighborhood of its presence at a settable time interval and by using, for example, a predetermined amount of power such as the lowest power. The time interval at which the advertising signal is to be transmitted at this time is to be a time interval longer than that of a case in which, for example, a change such as an error has occurred in the state of the apparatus. Note that at this time, the MFP 200 does not change the power of the advertising signal to be transmitted even if it has not received a connection request from a neighboring terminal such as the mobile terminal 30. Note that in this embodiment, although the MFP 200 continues the transmission of the advertising signal for notifying other apparatuses in the neighborhood of its presence at a predetermined time interval, the present invention is not limited to this. For example, the MFP 200 may transmit the advertising signal for notifying other apparatuses in the neighborhood of its presence only during a standby state and during an operation state or the MFP 200 may not transmit the advertising signal for notifying other apparatuses in the neighborhood of its presence. That is, at the point when the processing of FIG. 8 is to be started, the MFP 200 may not transmit the advertising signal. The MFP 200 may subsequently start the transmission of the advertising signal in response to the occurrence of a change in the apparatus state (to be described later). In addition, the processing of FIG. 8 may be executed only when the power has been turned on by the operation switch 504 of FIG. 5.

The MFP 200 specifies that the apparatus state has changed (step S801). Here, a change in the apparatus state exemplifies a case in which an event requiring intervention by the user who is to use the MFP 200 has occurred such as the occurrence of an error state in which printing cannot be performed due to, for example, running out of ink, running out of paper, an occurrence of a paper jam, or the like. The occurrence of an error state in a scanner or fax mode and the occurrence of a state that requires immediate notification of the user are also examples of changes in the apparatus state. A state that requires immediate notification to a user can be, for example, a case in which a scan has been completed by a scanner, an original is remaining on the scanner after a scan, or fax transmission has failed. Additionally, a stage in which an error is more likely to occur such as a state with low remaining ink amount (low ink state) can be a state that requires immediate notification to the user. Here, a "stage in which an error is more likely to occur" indicates a state in which a value indicating a predetermined state has exceeded a preset threshold, but has not yet changed to an error state. In this manner, whether the state of the functions of the MFP 200 has changed is specified in step S801. In addition, a state change related to the communication status of the MFP 200 may also be specified. Note that a state change of the MFP 200 need only be a state change which requires notification to a neighboring terminal (for example, the mobile terminal 30) and is not limited to these. The state change of the MFP 200 may be specified by the microcomputer 502 confirming the status of each portion included in the MFP 200 via the I/F 501 or may be specified in accordance with the notification from the CPU 402.

When the MFP 200 specifies that the apparatus state has changed, it subsequently sets "low" as the initial value of the radio wave strength of the advertising signal to be transmitted (step S802). Note that although three stages of settings, that is, "low", "medium", and "high" are used here, settings having two stages or four or more stages may also be used. In any of the cases, the lowest radio wave setting will be used out of these settings in step S802. The MFP 200 also resets the transmission time count of the advertising signal (step S803). That is, the transmission time count is set to the initial value (for example, "0"), and preparation for measuring the period in which the transmission of the advertising signal is continued is performed.

The MFP 200 transmits an advertising signal in the set radio wave strength ("low" in this case) (step S804). The MFP 200 then confirms whether a connection is already established with a neighboring terminal (step S805). That is, whether a connection is established is confirmed by the MFP 200 by receiving a connection request from the neighboring terminal in response to the transmitted advertising signal. If a connection is already established (YES in step S805), since the MFP 200 can recognize that another terminal is receiving the advertising signals, it confirms whether an interrupt instruction has been issued without increasing the radio wave strength (step S811). Subsequently, if the interrupt instruction has been issued (YES in step S811), the MFP 200 stops the transmission of the advertising signal (step S812). On the other hand, if no interrupt instruction has been issued (NO in step S811), the MFP 200 returns the process to step S804 and continues the transmission of advertising signal.

On the other hand, if a connection is not already established with a neighboring terminal (NO in step S805), the MFP 200 executes the reception processing and stands by for a signal to arrive from a neighboring terminal (step S806). That is, the MFP 200 stands by for a response to the advertising signal. Then, the MFP 200 confirms whether a connection request has arrived from a neighboring terminal (step S807). If the connection request has arrived (YES in step S807), the MFP 200 executes the connection processing (step S808) and subsequently changes the advertising information (step S809). That is, the MFP 200 switches the advertising signal to be transmitted. In step S809, for example, the advertising signal is switched to an advertising signal which includes information indicating that it is in use by another user. When the mobile terminal 30 receives this advertising signal, it displays a message such as "Currently handling connection made by XX" on the display unit 459. Subsequently, the MFP 200 cancels the session (step S810) and shifts the process to step S811. Step S811 and its subsequent processes are performed in the same manner as described above.

Note that the mobile terminal 30 which serves as the neighboring terminal of the MFP 200 displays on the screen, for example, the error which it has been notified from the MFP 200 in addition to performing an inquiry to the user about handling the error and notification prompting the resolution of the error. The mobile terminal 30 transmits a connection request to the MFP 200 in response to an operation for error cancellation by the user. An operation for error cancellation by the user can be, for example, pressing an icon instructing an automatic recovery of an error or an operation made at the terminal to indicate that ink replacement has been completed after ink replacement is performed in response to an out-of-ink error. Note that, in this embodiment, if the user receives a status change notification but does not execute an operation for error cancellation, the terminal will not transmit the connection request even if it has received the advertising signal and has acquired the information included in the signal (NO in step S807).

In this embodiment, if the radio wave strength is set to "low", the radio wave is not delivered with sufficient amount of power outside the range of the 5-m radius from the MFP 200. Here, "sufficient amount of power" indicates an amount of power that allows information to be extracted from the advertising signal. Hence, if a terminal capable of receiving this radio wave is not present within 5 m from the MFP 200, the MFP 200 cannot transfer the transmitted information to the terminal.

If none of the neighboring terminals can receive the radio wave, there is no connection that has been already established with a neighboring terminal (NO in step S805), and the MFP 200 will not receive a connection request (NO in step S807) since the mobile terminal 30 will not transmit the connection request. In this case, the MFP 200 will confirm whether a predetermined time has elapsed from the start of the transmission of the advertising signal (step S813). If the predetermined time from the start of the transmission of the advertising signal has not elapsed (NO in step S813), the MFP 200 returns the process to step S804 and continues the transmission of the advertising signal. On the other hand, if the predetermined time from the start of the transmission has elapsed (YES in step S813), the MFP 200 can confirm whether the radio wave strength has been set to "low" (step S814). If the radio wave strength has been set to "low" (YES in step S814), MFP 200 changes the setting of the radio wave to "medium" (step S815), returns the process to step S803, and resets the transmission time count of the advertising signal.

Next, the MFP 200 transmits the advertising signal by the radio wave strength set to "medium" and executes processing such as the connection request standby processing.

When a predetermined time has elapsed without an arrival of a connection request after the advertising signal has been transmitted in "medium" radio wave strength, the setting of the radio wave strength is changed to "high" (step S817) as the radio wave strength has been already set to "medium" in this case (No in step S814 and YES in step S816). The MFP 200 then returns the process to step S803 and resets the transmission time count of the advertising signal. Subsequently, the MFP 200 transmits the advertising signal in the radio wave strength set to "high" and executes processing such as the connection request standby processing. When a predetermined time has elapsed without an arrival of a connection request after the advertising signal has been transmitted in "high" radio wave strength, the process shifts to step S819 in this case (NO in steps S814 and S816 and YES in step S818). In this case, the MFP 200 registers a "no connection request" error (step S819). On the other hand, if the radio wave strength setting is not "low", "medium", or "high" (NO in steps S814, S816, and S818), the MFP 200 registers a "radio wave strength unknown" error (step S820).

Note that, for example, if the processing ends due to an error such as the no connection request error, the MFP 200 can transmit the information which it has tried to transmit by the advertising signal by using another communication function such as the WLAN unit 416 or the like. Also, if the processing has ended due to an error, the MFP 200 can stand by for a predetermined time and repetitively execute the processing of FIG. 8 again. This can increase the probability that the neighboring apparatuses will be notified of the necessary information. Note that in this embodiment, when a change occurs in the apparatus state of the MFP 200, the advertising signal is transmitted while increasing the power (step S801). However, in a case in which the apparatus state changes from an abnormal state to a normal state, such processing may not be performed. In other words, the aforementioned processing may be performed only when the apparatus state changes from the normal state to the abnormal state. Additionally, when the apparatus state returns to the normal state while the processing of FIG. 8 is executed, the processing of FIG. 8 may be ended. For example, if a paper jam occurs in the MFP 200, a person present nearby may fix the paper jam even if a terminal is not in the neighborhood. In this case, since "the occurrence of a paper jam", which requires notification as a rule, has been resolved, the notification of the information to the other terminals in the neighborhood becomes unnecessary. Furthermore, for example, when the MFP 200 runs out of ink and the ink cartridge is replaced by the user, the MFP 200 can recognize this operation. In this case, the replacement of the ink cartridge obviates the need for the MFP 200 to notify neighboring terminals of further information related to the change in the apparatus state. Hence, in this case (when the apparatus state changes from the abnormal state to the normal state), the MFP 200 can transmit the advertising signal of the apparatus information using low power as that in a normal state and may not transmit the advertising signal using high power. That is, when there is no more information which needs to be notified to the neighboring terminals, the MFP 200 can return the setting of the radio wave strength to the initial value of "low" and transmit, for example, an advertising signal including the apparatus information but not including the state information.

Figure 10:
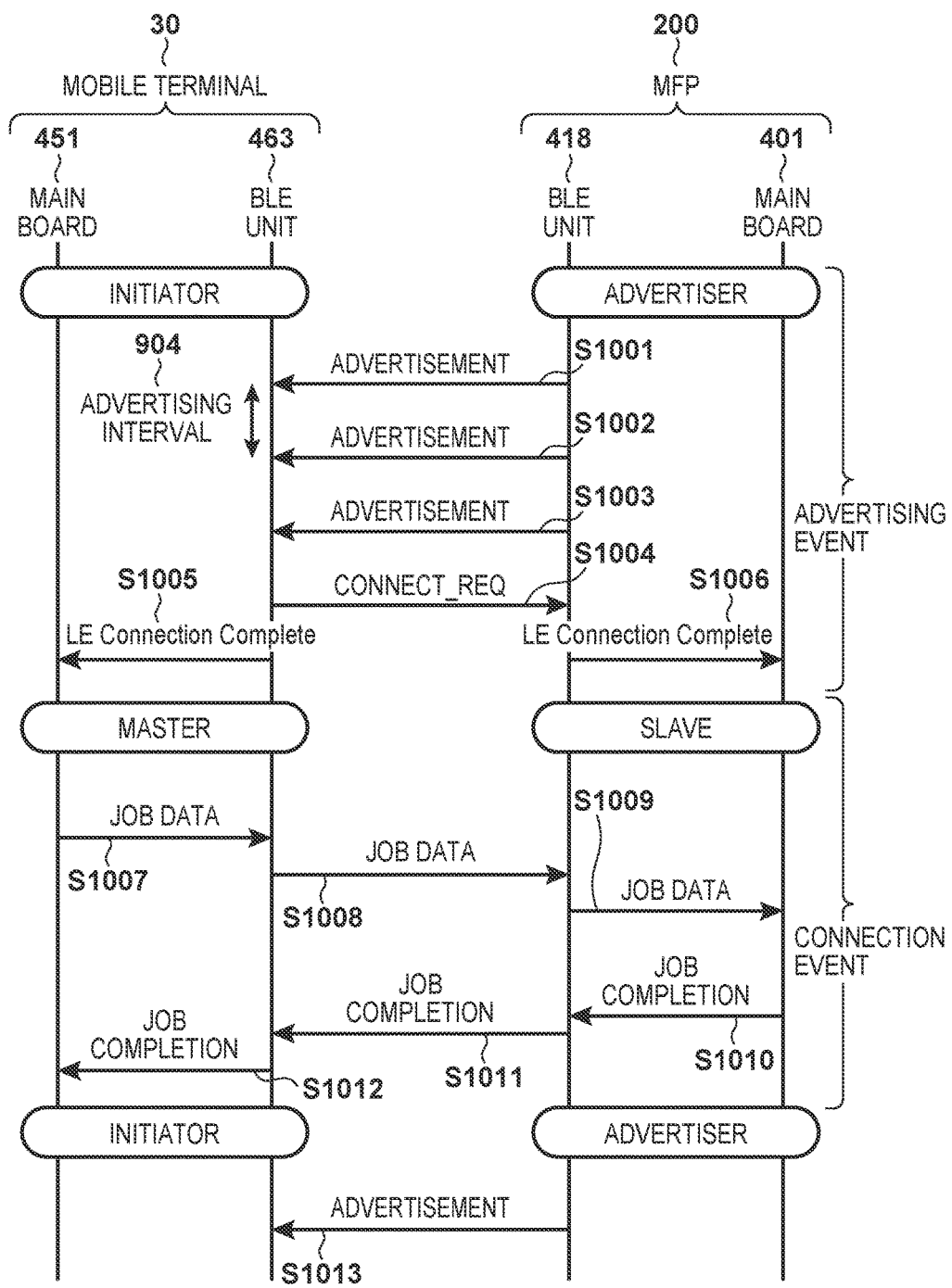
FIG. 10 is a sequence chart showing a processing sequence between a mobile terminal and the MFP.

The procedure in which the mobile terminal 30 causes the MFP 200 to execute the print processing will be described with reference to FIG. 10. FIG. 10 is a sequence chart showing a processing sequence between the mobile terminal 30 and the MFP 200 from advertising to job reception and job completion.

In FIG. 10, the mobile terminal 30 is an initiator standing by for an advertising packet from a neighboring advertiser. Here, the MFP 200 is an advertiser that executes an advertising event in which an advertising packet is transmitted in the advertising interval 904. Assume that the set of intervals Tx908 and RX909 shown in FIG. 9 correspond to the advertising operations (S1001 to S1003). The mobile terminal 30 receives an advertising packet from the MFP 200 so that the mobile terminal 30 can specify a capability of the MFP 200 and error states. Note that, as described above, if the apparatus state changes, the MFP 200 will progressively increase the radio wave strength until it receives a connection request.

If the MFP 200 which is suitable for job execution is present, the mobile terminal 30 transmits CONNECT_REQ which is a request to transit to a connection event for network connection (S1004). The MFP 200 prepares to transit to the connection event when it receives CONNECT_REQ. The BT unit 418 and the BT unit 463 notify the main board 401 and the main board 451, respectively, of LE Connection Complete (S1005 and S1006). As a result, the mobile terminal 30 and the MFP 200 change into a master and a slave, respectively.

After transiting to the connection event, the mobile terminal 30 serving as the master and the MFP 200 serving as the slave establish a connection. Note that in the BLE standard, the master can form a star-shape topology of "1: many" with the slave.

After changing into a slave, the MFP 200 does not broadcast the advertising packet to the mobile terminal 30. Hence, neighboring mobile terminals other than the mobile terminal 30 that has established the connection with the MFP 200 cannot specify the information related to the MFP 200 via the advertising operation. In contrast, in this embodiment, the mobile terminal 30 can specify the error state of the MFP 200 before establishing the connection with the MFP 200 by receiving the advertising packet.

In the mobile terminal 30, the main board 451 transmits the job data of a print job to the BT unit 463 (S1007). Here, as the job data, the mainboard may transmit a print job main body embedded with image data or notify the BT unit of only the pointer information to the print job. The BT unit 463 of the mobile terminal 30 transmits the job data of the print job to the BT unit 418 (S1008). Note that in this embodiment, when the pointer information (job information) is transmitted, the job data of the print job is subsequently transmitted to the BT unit 418. However, the present invention is not limited to this. The print job main body may be transmitted by a communication means other than BLE and may be transmitted using, for example, the WLAN unit 416 which is capable of communicating in a wider range than BLE. In this embodiment, as information related to the job, the print job main body or the pointer information is transmitted.

In MFP 200, the BT unit 418 transmits the job data which it has received to the main board 401 (S1009). Upon receiving the job data, the main board 401 notifies the BT unit 418 of job completion (S1010). The timing to notify the BT unit 418 of the job completion can be after the completion of the job operation, at the timing in which the reception of job data has ended, or at the timing in which the notification about a pointer to the job has been performed. Note that if the notification about the pointer to the job is performed, the MFP 200 may acquire, for example, the actual data of the job by using the WLAN unit 416.

In the MFP 200, the BT unit 418 notifies the BT unit 463 of the mobile terminal 30 of the received job completion (S1011). The BT unit 463 notifies the main board 451 of the received job completion (S1012).

Subsequently, the mobile terminal 30 and the MFP 200 change back to the initiator and the advertiser, respectively, and the MFP 200 restarts the advertising operation (S1013).

As described above, the MFP 200 can recognize that the mobile terminal 30 has received the connection request by transmitting the advertising signal in a predetermined time interval and receiving the connection request from the terminal which has received the advertising signal. Also, when a change occurs in the apparatus state, the MFP 200 continues the transmission of the advertising signal and the monitoring of the connection request while increasing the transmission power until the reception of the connection request by a neighboring terminal can be confirmed or until the error is canceled. Hence, the probability that the information to be notified will be delivered to the neighboring terminal by the advertising signal can be increased. On the other hand, when, for example, there is no change to the self-apparatus state, the MFP 200 does not increase the power, but maintains the power of the advertising signal (for example, at the lowest value) even if no connection request has been received. As a result, the MFP 200 can notify, as much as possible, a neighboring terminal of the information to be notified while ensuring low-power capability of communication by BLE.

Note that in this embodiment, an example in which the MFP recognizes whether an advertising signal has been received by the neighboring mobile terminal 30 by whether a connection request has been received by the MFP has been described. However, this confirmation may be performed by another method. For example, the mobile terminal 30 which received the advertising signal may access the MFP 200 by a communication function other than BLE and notify the MFP 200 of the reception of the advertising signal. In this case, the MFP 200 can determine by this accessing operation that the terminal has received the advertising signal and end or temporarily stop the processing of FIG. 8.

Also, in this embodiment, the advertising signal of the BLE communication was changed for the normal state and for a state different from a normal state (a state in which a state change has occurred). However, the present invention is not limited to this. The advertising signal may be broadcast only when a state change occurs in the apparatus.

Additionally, in this embodiment, although a method based on BLE has been described, the MFP 200 can apply the above-described method in an arbitrary communication system in which a predetermined signal can be transmitted and the reception of the predetermined signal by a neighboring apparatus can be known. That is, the MFP 200 may transmit a predetermined signal for notifying a neighboring apparatus of predetermined information such as a change in the apparatus state, determine whether the signal has been received by the neighboring apparatus, and increase the transmission power of the predetermined signal in accordance with the determination result. At this time, if a signal other than the predetermined information is to be transmitted, the MFP 200 tries not to increase the transmission power even if the predetermined signal has not been received by the neighboring apparatus. That is, the MFP 200 suppresses the power related to signal transmission in a normal state while allowing signal transmission using high power when necessary information is to be transmitted. As a result, the MFP 200 can transmit information that should be notified as much as possible to the neighboring terminal while performing low-power communication.

Furthermore, as described with reference to the sequence of FIG. 10, after the transition to a connection event, the advertiser cannot broadcast an advertising packet. Hence, if no transition to the connection event is made, it increases the probability that a neighboring mobile terminal other than the mobile terminal 30, with which the advertiser has established a connection event, will receive the advertising packet from the advertiser. According to this embodiment, compared to a conventional case in which the information related to the MFP 200 is received after the transition to the connection event, the mobile terminal can be notified of the information related to the MFP 200 by only the advertising packet that is broadcast before the connection event. Therefore, both the MFP 200 and the mobile terminal 30 can suppress the power consumption due to establishing a connection when a print job cannot be executed and eliminate the cancellation process after the connection. In addition, when a plurality of mobile terminals 30 are present in the effective communication range of the MFP 200, any of the mobile terminals 30 in the effective communication range can specify the state of the MFP 200 without establishing a connection with the MFP 200.

According to the present invention, when communication apparatus transmits a signal including specific information, the probability that another apparatus can acquire the specific information can be increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131032, filed Jun. 30, 2016 which is hereby incorporated by reference herein in its entirety.

What is claimed is:

1. A communication apparatus that can communicate with an information processing apparatus by a wireless communication method, comprising:
at least one processor executing stored instructions to cause the communication apparatus to
broadcast an advertising signal based on a Bluetooth Low Energy (BLE) standard;
receive a connection request transmitted from the information processing apparatus that has received the advertising signal, wherein in a case where a state change of the communication apparatus has occurred, a first advertising signal which includes information indicating an apparatus state is broadcasted; and
set a radio wave strength of the advertising signal to be broadcast, based on whether or not the advertising signal is the first advertising signal which includes information indicating the apparatus state,
wherein, in a case where the first advertising signal which includes information indicating the apparatus state is broadcasted and of which the radio wave strength is set to a first radio wave strength and where the connection request is not received even after a predetermined time has elapsed since broadcasting the first advertising signal which includes the information indicating the apparatus state, the radio wave strength of the first advertising signal is changed to a second radio wave strength that is higher than the first radio wave strength, and
in a case where a second advertising signal is broadcasted which does not include the information indicating the apparatus state and of which the radio wave strength is set to the first radio wave strength and where the connection request is not received even after the predetermined time has elapsed since broadcasting the second advertising signal which does not include the information indicating the apparatus state, the radio wave strength of the second advertising signal is not changed.

2. The apparatus according to claim 1, wherein an initial value of transmission power of the first advertising signal which includes the information indicating the apparatus state is equal to a value of transmission power of the second advertising signal which does not include the information indicating the apparatus state.

3. The apparatus according to claim 1, wherein the communication apparatus has a function of at least one of print, scan, copy, and fax functions.

4. The apparatus according to claim 1, wherein the information indicating the apparatus state is information indicating a change in a state of the communication apparatus.

5. The apparatus according to claim 4, wherein the change in the state of the communication apparatus includes at least one of a change to an error state and a change to a stage in which an error is more likely to occur.

6. A control method of a communication apparatus that can communicate with an information processing apparatus by a wireless communication method, the method comprising:
broadcasting an advertising signal wirelessly based on a Bluetooth Low Energy (BLE) standard; and
receiving a connection request transmitted from the information processing apparatus that has received the advertising signal, wherein in a case where a state change of the communication apparatus has occurred, a first advertising signal which includes information indicating an apparatus state is broadcast,
wherein a radio wave strength of the advertising signal to be transmitted is set based on whether or not the advertising signal is the first advertising signal which includes information indicating the apparatus state,
wherein, in a case where the first advertising signal which includes information indicating the apparatus state is broadcasted and of which the radio wave strength is set to a first radio wave strength and where the connection request is not received even after a predetermined time has elapsed since the broadcasting of the first advertising signal which includes the information indicating the apparatus state, the radio wave strength of the first advertising signal is changed to a second radio wave strength that is higher than the first radio wave strength,
wherein, in a case where a second advertising signal which does not include information indicating the apparatus state is broadcasted and of which the radio wave strength is set to the first radio wave strength and where the connection request is not received even after the predetermined time has elapsed since the second advertising signal which does not include the information indicating the apparatus state is broadcast, the radio wave strength of the second advertising signal is not changed.

7. The method according to claim 6, wherein an initial value of transmission power of the first advertising signal which includes the information indicating the apparatus state is equal to a value of transmission power of the second advertising signal which does not include the information indicating the apparatus state.

8. The method according to claim 6, wherein the communication apparatus has a function of at least one of print, scan, copy, and fax functions.

9. The method according to claim 6, wherein the information indicating the apparatus state is information indicating a change in a state of the communication apparatus.

10. The method according to claim 9, wherein the change in the state of the communication apparatus includes at least one of a change to an error state and a change to a stage in which an error is more likely to occur.

11. A non-transitory computer-readable storage medium storing a computer program for causing a computer included in a communication apparatus that can communicate with an information processing apparatus by a wireless communication method to
broadcast an advertising signal based on a Bluetooth Low Energy (BLE) standard, and
receive a connection request transmitted from the information processing apparatus that has received the advertising signal, wherein in a case where a state change of the communication apparatus has occurred, a first advertising signal which includes information indicating an apparatus state is broadcast,
wherein a radio wave strength of the advertising signal to be transmitted is set based on whether or not the advertising signal is the first advertising signal which includes information indicating the apparatus state,
wherein, in a case where the first advertising signal which includes information indicating the apparatus state is broadcasted and of which the radio wave strength is set to a first radio wave strength and where the connection request is not received even after a predetermined time has elapsed since the broadcasting of the first advertising signal which includes the information indicating the apparatus state, the radio wave strength of the first advertising signal is changed to a second radio wave strength that is higher than the first radio wave strength, and wherein, in a case where a second advertising signal which does not include information indicating the apparatus state is broadcasted and of which the radio wave strength is set to the first radio wave strength and where the connection request is not received even after the predetermined time has elapsed since the second advertising signal which does not include the information indicating the apparatus state is broadcast, the radio wave strength of the second advertising signal is not changed.

* * * * *